United States Patent
Chen

(10) Patent No.: US 12,450,098 B2
(45) Date of Patent: Oct. 21, 2025

(54) DATA PROCESSING METHOD, ELECTRONIC DEVICE, AND COMPUTER STORAGE MEDIUM

(71) Applicant: HON HAI PRECISION INDUSTRY CO., LTD., New Taipei (TW)

(72) Inventor: Wen-Ruei Chen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 573 days.

(21) Appl. No.: 17/712,154

(22) Filed: Apr. 3, 2022

(65) Prior Publication Data

US 2022/0326996 A1 Oct. 13, 2022

(30) Foreign Application Priority Data

Apr. 8, 2021 (CN) .......................... 202110379055.8

(51) Int. Cl.
  *G06F 9/46* (2006.01)
  *G06F 9/50* (2006.01)

(52) U.S. Cl.
  CPC .................................. *G06F 9/505* (2013.01)

(58) Field of Classification Search
  CPC ....................................................... G06F 9/505
  USPC ....................................................... 718/104
  See application file for complete search history.

(56) References Cited

U.S. PATENT DOCUMENTS

| | | | | |
|---|---|---|---|---|
| 11,609,777 | B2* | 3/2023 | Purohit | G06F 9/5077 |
| 2010/0125847 | A1* | 5/2010 | Hayashi | G06F 9/505 |
| | | | | 718/102 |
| 2011/0072160 | A1* | 3/2011 | Nonaka | G06F 13/4059 |
| | | | | 709/246 |
| 2014/0317635 | A1* | 10/2014 | Konno | G06F 9/505 |
| | | | | 718/105 |
| 2015/0236974 | A1* | 8/2015 | Minamitake | G06F 9/505 |
| | | | | 709/226 |
| 2016/0124992 | A1* | 5/2016 | Alesiani | G06F 9/5033 |
| | | | | 707/737 |
| 2017/0148002 | A1* | 5/2017 | Stock | G07F 17/0035 |
| 2018/0150299 | A1* | 5/2018 | Balle | G06F 11/3006 |
| 2018/0150334 | A1* | 5/2018 | Bernat | H04L 47/20 |
| 2018/0341525 | A1* | 11/2018 | Gupta | G06F 9/4881 |
| 2019/0129763 | A1* | 5/2019 | Matsuura | G06F 9/50 |
| 2021/0263737 | A1* | 8/2021 | Lee | G06T 3/4084 |
| 2022/0156086 | A1* | 5/2022 | Wang | G06F 9/5055 |
| 2022/0326996 | A1* | 10/2022 | Chen | G06F 9/5066 |
| 2023/0004433 | A1* | 1/2023 | Kan | G06F 9/505 |
| 2023/0130644 | A1* | 4/2023 | Nordin | G06F 9/54 |
| | | | | 718/102 |

* cited by examiner

FOREIGN PATENT DOCUMENTS

| | | |
|---|---|---|
| CN | 104346433 | 2/2015 |
| CN | 110958183 | 4/2020 |
| CN | 111966496 | 11/2020 |

*Primary Examiner* — Mehran Kamran
(74) *Attorney, Agent, or Firm* — ScienBiziP, P.C.

(57) ABSTRACT

In a data processing method, data to be processed are obtained by a first electronic device. The first electronic device receives operation information of multiple second electronic devices from the multiple second electronic devices, determines target devices from the multiple second electronic devices according to the data and the operation information, and divides the data into data blocks according to the operation information. The data blocks are sent to the target devices for processing. The method improves the efficiency of data processing.

12 Claims, 3 Drawing Sheets

DATA PROCESSING METHOD, ELECTRONIC DEVICE, AND COMPUTER STORAGE MEDIUM

FIELD

The present disclosure relates to a data processing method, an electronic device, and a computer storage medium.

BACKGROUND

Accelerators are often used for accelerating data processing. For example, in the field of artificial intelligence (AI), especially artificial neural network, machine vision, and machine learning, AI accelerators are used to accelerate data processing of AI applications. However, presently, the accelerators can only accelerate data processing for simple network topologies (such as ResNet and MobileNet), but cannot accelerate data processing for more complex network topologies.

DETAILED DESCRIPTION

In order to provide a more clear understanding of the objects, features, and advantages of the present disclosure, the same are given with reference to the drawings and specific embodiments. It should be noted that the embodiments in the present disclosure and the features in the embodiments may be combined with each other without conflict.

In the following description, numerous specific details are set forth in order to provide a full understanding of the present disclosure. The present disclosure may be practiced otherwise than as described herein. The following specific embodiments are not to limit the scope of the present disclosure.

Unless defined otherwise, all technical and scientific terms herein have the same meaning as used in the field of the art technology as generally understood. The terms used in the present disclosure are for the purposes of describing particular embodiments and are not intended to limit the present disclosure.

The embodiments of the present disclosure provide a data processing method, an electronic device, and a computer-readable storage medium.

Figure 1:
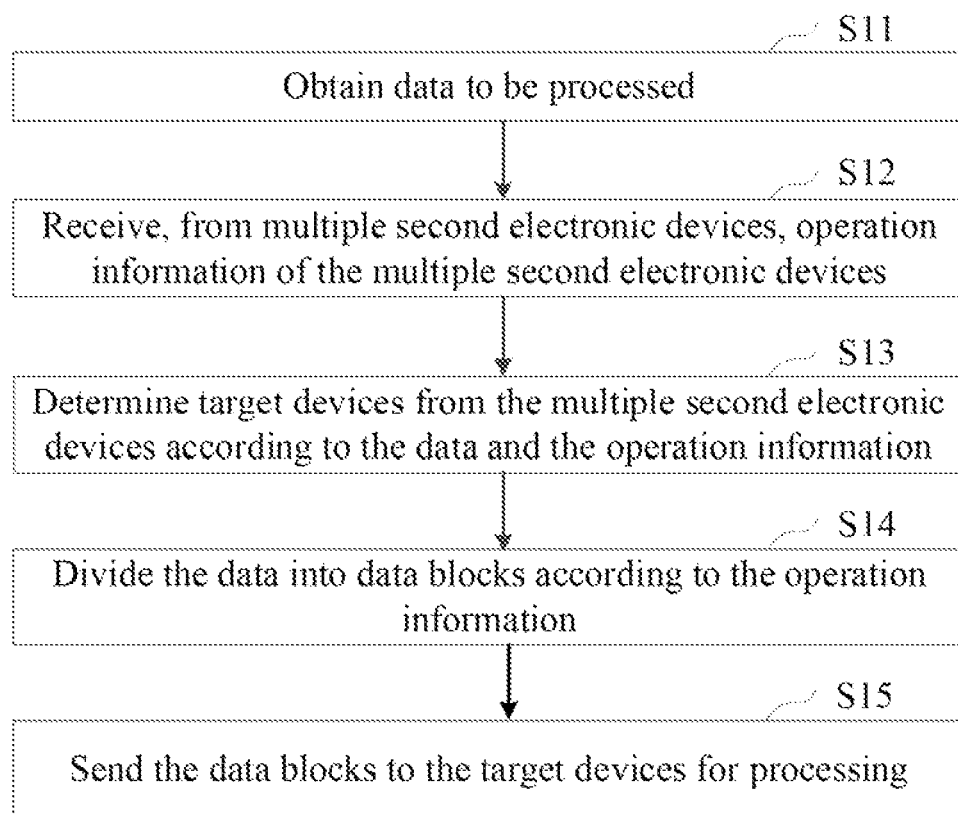
FIG. 1 shows a flow chart of one embodiment of a data processing method of the present disclosure.

FIG. 1 shows a flow chart of one embodiment of a data processing method of the present disclosure.

As shown in FIG. 1, the data processing method includes blocks S11 to S15. According to different requirements, the order of the blocks is illustrative only and the order of the blocks can be changed. Additional blocks can be added or fewer blocks can be utilized without departing from this disclosure. The method can be applied to a first electronic device. The first electronic device can be an inference engine.

At block S11, a first electronic device obtains data to be processed.

The data can include images and/or texts.

In some embodiments, the first electronic device can establish communication with data sources, receive files (such as images and/or texts) from the data sources, and integrate the files to obtain the data to be processed. The first electronic device can establish communication with one or more data sources.

In one embodiment, each file received from a data source can have a degree of importance, and the first electronic device integrates the files according to the degree of importance of each file. The degree of importance of the file can be determined according to a tag of the file. The degree of importance of the file can also be determined according to a creation time of the file. For example, the earlier the creation time, the higher the degree of importance of the file may be.

The first electronic device can sort files according to degrees of importance of the files, and integrate the files according to ordering of the files. The first electronic device can sort files with higher degrees of importance before files with lower degrees of importance, so as to speed up data processing.

At block S12, the first electronic device receives, from multiple second electronic devices, operation information of the multiple second electronic devices.

The first electronic device can obtain the operation information of the multiple second electronic devices that have been authenticated, so as to ensure safety of the data processing. A second electronic device may be registered on the first electronic device, for the second electronic device to be regarded as authenticated.

At block S13, the first electronic device determines target devices from the multiple second electronic devices according to the data and the operation information.

The first electronic device can determine the target devices from the multiple second electronic devices according to an amount of the data and the operation information of the multiple second electronic devices.

In some embodiments, determining target devices from the multiple second electronic devices according to the data and the operation information includes: calculating a load of each of the multiple second electronic devices according to the operation information; determining a plurality of candidate devices from the multiple second electronic devices according to the load; and determining the target devices from the plurality of candidate devices according to the data.

The first electronic device can determine whether the load of each second electronic device is smaller than a maximum load, and determine that the second electronic device is a candidate device if the load of the second electronic device is not greater than the maximum load.

In some embodiments, determining the target devices from the plurality of candidate devices according to the data includes: calculating a total acceleration amount required in respect of the data; and determining the target devices from the plurality of candidate devices according to the total acceleration amount.

The first electronic device determines the target devices from the plurality of candidate devices. The target devices can finish processing the data.

At block S14, the first electronic device divides the data into data blocks according to the operation information.

The first electronic device can determine an individual acceleration amount of each target device according to the operation information of the target device, and divide the data according to the individual acceleration amount to obtain the data blocks.

Figure 2:
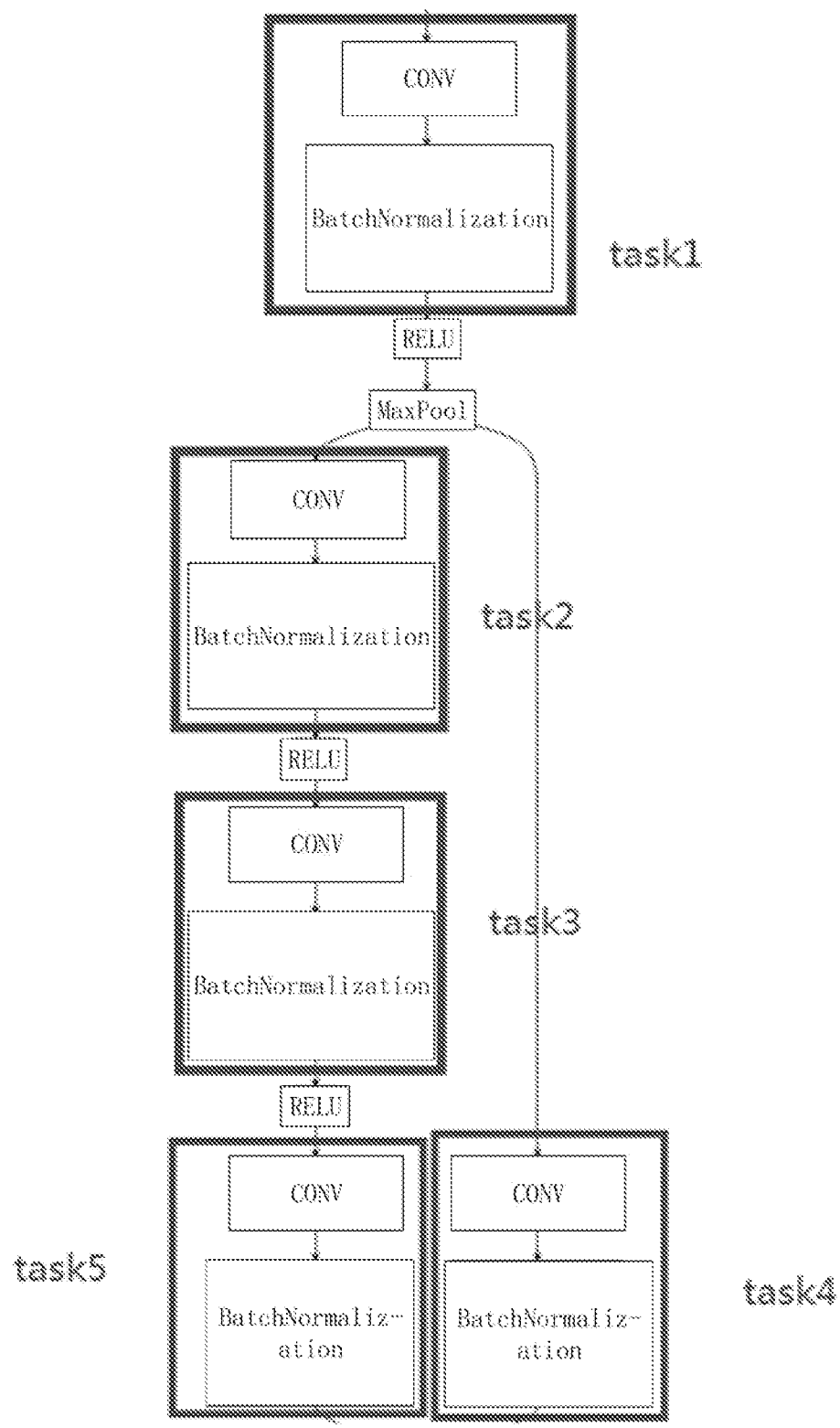
FIG. 2 illustrates one example of data divided into data blocks.

FIG. 2 illustrates one example of the data divided into data blocks. As shown in FIG. 2, the data are divided into five data blocks denoted as task1, task2, task3, task4, and task5 according to the operation information.

In some embodiments, dividing the data into data blocks according to the operation information includes: obtaining a maximum load of each of the target devices; calculating an individual acceleration amount of each of the target devices according to the operation information and the maximum load of each of the target devices; and dividing the data into the data blocks according to the individual acceleration amount.

A maximum load of each target device may be preset. The target device can normally accelerate data processing when the magnitude of the load of the target device is less than the maximum load. The first electronic device calculates an individual acceleration amount of each target device according to the operation information and the maximum load of the target device. The first electronic device divides the data into the data blocks according to the individual acceleration amount of each target device.

In some embodiments, dividing the data into the data blocks according to the individual acceleration amount includes: obtaining tags of the data; and dividing the data into the data blocks according to the individual acceleration amount and the tags.

The data can include different tags for identifying different contents. The first electronic device can divide the data into the data blocks according to the individual acceleration amount and the tags. Contents with the same tag in the data are divided to one data block.

At block S15, the first electronic device sends the data blocks to the target devices for processing.

Each data block corresponds to a certain target device. The first electronic device can send each data block to the certain target device.

For example, the first electronic device determines a target device corresponding to a data block according to an acceleration amount required in respect of the data block, and sends the data block to the corresponding target device for processing.

In some embodiments, after sending the data blocks to the target devices for processing, the first electronic device obtains processing results of the target devices on the data blocks, and generates a report showing the processing results.

In one example, the first electronic device obtains processing results of all the target devices, and generates a report according, to a preset rule.

In some embodiments, it is the first electronic device which processes the data if no target devices can be determined from the multiple second electronic devices according to the data and the operation information.

When no target devices are determined from the multiple second electronic devices, the data can be processed by the first electronic device. This ensures that the data is processed normally. In one embodiment, when no target devices are determined from the multiple second electronic devices, the first electronic device can issue an alert.

The data processing method of FIG. 1 improves the efficiency of accelerating data processing.

Figure 3:
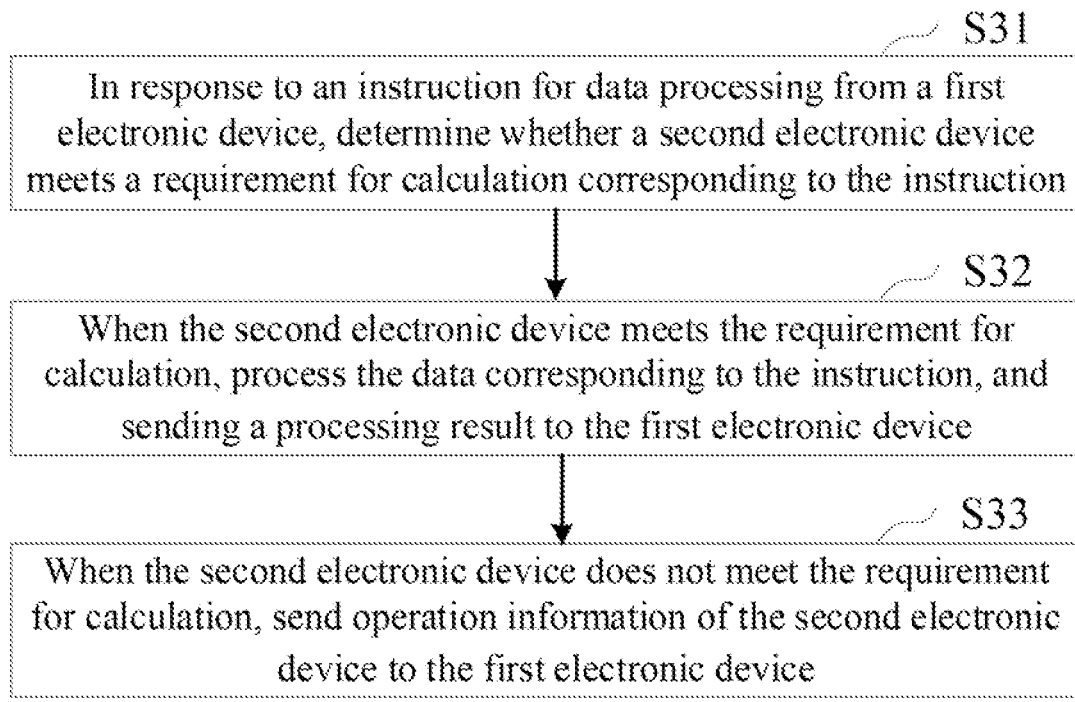
FIG. 3 shows a flow chart of another embodiment of the data processing method.

FIG. 3 shows a flow chart of another embodiment of the method. The data processing method in FIG. 3 includes blocks S31 to S33. According to different requirements, the order of the blocks is illustrative only and the order of the blocks can be changed. Additional blocks can be added or fewer blocks can be utilized without departing from this disclosure. The method can be applied to a second electronic device. The second electronic device can include an artificial intelligence (AI) accelerator.

At block S31, in response to an instruction for data processing from a first electronic device, a second electronic device determines whether the second electronic device meets a requirement for calculation corresponding to the instruction.

Upon reception of the instruction for data processing from the first electronic device, the second electronic device obtains the requirement for calculation corresponding to the instruction, and determines whether the second electronic device meets the requirement for calculation.

At block S32, when the second electronic device meets the requirement for calculation, the second electronic device processes data corresponding to the instruction, and sending a processing result to the first electronic device.

At block S33, when the second electronic device does not meet the requirement for calculation, the second electronic device sends operation information of the second electronic device to the first electronic device, causing the first electronic device to determine target devices from multiple second electronic devices according to the data and operation information of the multiple second electronic devices, divide the data into data blocks according to the operation information of the multiple second electronic devices, and send the data blocks to the target devices for processing.

The data processing method of FIG. 3 ensures normal accelerated processing of the data corresponding to the instruction, and improves the efficiency of accelerating data processing.

Figure 4:
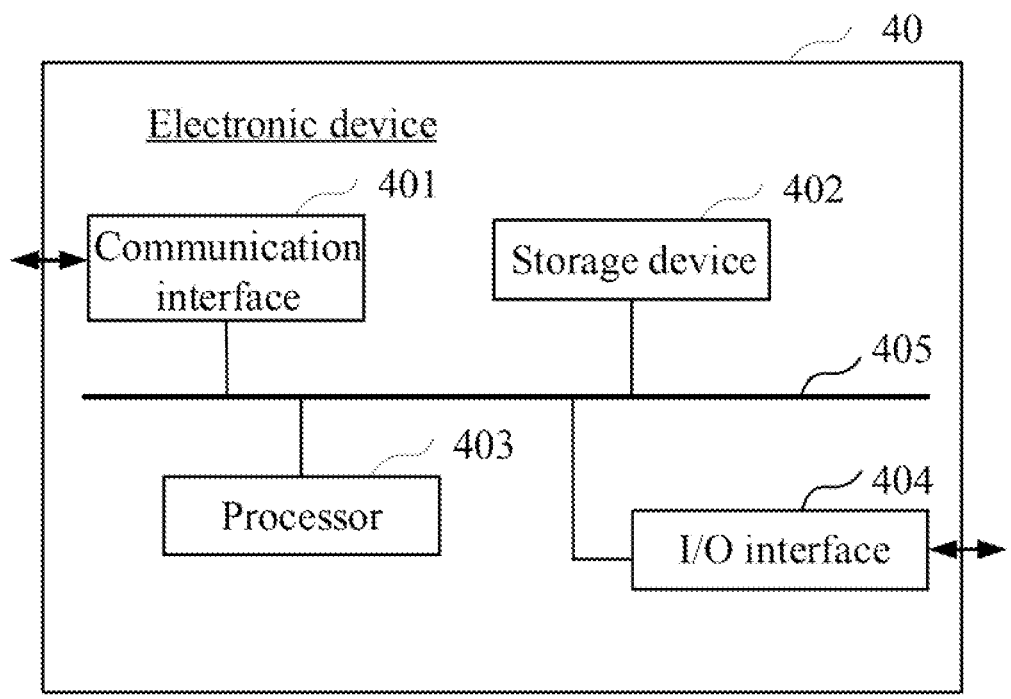
FIG. 4 illustrates an electronic device for data processing according to one embodiment of the present disclosure.

FIG. 4 illustrates an electronic device 40 for data processing according to one embodiment of the present disclosure. The electronic device 40 can be the first electronic device of FIG. 1 or the second electronic device of FIG. 3.

The first electronic device can include an inference engine. The second electronic device can include an AI accelerator.

The electronic device 40 can be included in a network. The network can include, but is not limited to, the Internet, a wide area network, a metropolitan area network, a local area network, a virtual private network (VPN), etc.

As shown in FIG. 4, the electronic device 40 includes a communication interface 401, a storage device 402, a processor 403, an input/output (I/O) interface 404, and a bus 405. The processor 403 is connected to the communication interface 401, the storage device 402, and the I/O interface 404 through the bus 405.

The communication interface 401 is used for communication. The communication interface 401 may be an existing interface of the electronic device 40 or a custom interface of the electronic device 40. The communication interface 401 may be a network interface, such as a wireless local area network (WLAN) interface, a cellular network communication interface, or a combination thereof.

The storage device 402 may be used to store program codes and various data of computer programs. For example, the storage device 402 may be used to store a data processing system installed in the electronic device 40 and implement the running of stored programs or data during an operation of the electronic device 40. The storage device 402 may include a non-volatile storage medium and a volatile storage medium. The storage device 402 may include a hard disk, a memory, a plug-in hard disk, a smart memory card (SMC), a Secure Digital (SD) card, a flash card, at least one disk storage device, a flash memory device, or other storage medium.

The processor 403 provides computing and control capabilities of the electronic device 40. For example, the processor 403 executes a computer program stored in the storage device 402 to implement the blocks in the data processing method of FIG. 1 or FIG. 3.

The processor 403 may be a central processing unit (CPU) or other general-purpose processor, a digital signal processor (DSP), a disclosure specific integrated circuit (ASIC), a field-programmable gate array (FPGA) or other programmable logic device, a discrete gate, or a transistor logic device, or a discrete hardware component, etc. The processor 403 may be a microprocessor or any conventional processor.

The I/O interface 404 is used for input or output data. For example, the I/O interface 404 can be used to connect various input and output devices (mouse, keyboard, three-dimensional touch device, display screen, etc.) to input and output information.

The bus 405 is used to provide a communication channel among the communication interface 401, the storage device 402, the processor 403, and the I/O interface 404 in the electronic device 40.

Those skilled in the art can understand that the structure shown in FIG. 3 is only a representation of a structure related to the present disclosure, and does not constitute a limitation on the electronic device 40 to which the present disclosure is applied. Another example of the electronic device 40 may include more or fewer parts than shown in the figure, or combine some parts, or have a different arrangement of parts.

In one embodiment, the processor 403 executes computer-readable instructions stored in the storage device 402, to perform the operations: obtaining data to be processed; receiving operation information of multiple second electronic devices from the multiple second electronic devices; determining target devices from the multiple second electronic devices according to the data and the operation information; dividing the data into data blocks according to the operation information; and sending the data blocks to the target devices for processing.

In some embodiments, the processor 403 executes the computer-readable instructions stored in the storage device 402, to further perform the operations: calculating a load of each of the multiple second electronic devices according to the operation information; determining a plurality of candidate devices from the multiple second electronic devices according to the load; and determining the target devices from the plurality of candidate devices according to the data.

In some embodiments, the processor 403 executes the computer-readable instructions stored in the storage device 402, to further perform the operations: calculating a total acceleration amount required in respect of the data; and determining the target devices from the plurality of candidate devices according to the total acceleration amount.

In some embodiments, the processor 403 executes the computer-readable instructions stored in the storage device 402, to further perform the operations: obtaining a maximum load of each of the target devices; calculating an individual acceleration amount of each of the target devices according to the operation information and the maximum load of each of the target devices; and dividing the data into the data blocks according to the individual acceleration amount.

In some embodiments, the processor 403 executes the computer-readable instructions stored in the storage device 402, to further perform the operations: obtaining tags of the data; and dividing the data into the data blocks according to the individual acceleration amount and the tags.

In some embodiments, the processor 403 executes the computer-readable instructions stored in the storage device 402, to further perform the operations: processing, by the first electronic device, the data when no target devices are determined from the multiple second electronic devices according to the data and the operation information.

In some embodiments, the processor 403 executes the computer-readable instructions stored in the storage device 402, to further perform the operations: obtaining processing results of the target devices on the data blocks; and generating a report showing the processing results.

In some embodiment, the processor 403 executes computer-readable instructions stored in the storage device 402, to perform the operations: in response to an instruction for data processing from a first electronic device, determining whether a second electronic device meets a requirement for calculation corresponding to the instruction; when the second electronic device meets the requirement for calculation, processing data corresponding to the instruction, and sending a processing result to the first electronic device; and when the second electronic device does not meet the requirement for calculation, sending operation information of the second electronic device to the first electronic device, causing the first electronic device to determine target devices from multiple second electronic devices according to the data and operation information of the multiple second electronic devices, divide the data into data blocks according to the operation information of the multiple second electronic devices, and send the data blocks to the target devices for processing.

Details of the processor 403 executing the computer-readable instructions stored in the storage device 402 to implement data processing, can refer to the description of the data processing methods in FIG. 1 and FIG. 3, and are not repeated here.

The present disclosure also provides a computer-readable storage medium. The computer-readable storage medium stores a computer program, the computer program includes instructions. The instructions are executed by a processor of an electronic device to implement the data processing method.

The computer-readable storage medium may be an internal storage device of the electronic device described above, such as a hard disk or a memory of the electronic device. The computer-readable storage medium may also be an external storage device of the electronic device, such as a plug-in hard disk, a smart memory card (SMC), a secure digital (SD), and a flash card in the electronic device.

The present disclosure is not limited to the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim. Furthermore, the word "comprising" does not exclude other units nor does the singular exclude the plural. A plurality of units or devices stated in the system claims may also be implemented by one unit or one device through software or hardware. Words such as "first" and "second" indicate names, but not any particular order.

Finally, the above embodiments are only used to illustrate technical solutions of the present disclosure and are not to be taken as restrictions on the technical solutions. Although the present disclosure has been described in detail with reference to the above embodiments, those skilled in the art should understand that the technical solutions described in one embodiment can be modified, or some of the technical features can be equivalently substituted, and that these modifications or substitutions are not to detract from the essence of the technical solutions or from the scope of the technical solutions of the embodiments of the present disclosure.

I claim:

1. A data processing method executed by a first electronic device, the data processing method comprising:
    obtaining data to be processed;
    receiving, from a plurality of second electronic devices, operation information of the plurality of second electronic devices;
    determining target devices from the plurality of second electronic devices according to the data and the operation information;
    dividing the data into data blocks according to the operation information, comprises: obtaining a maximum load of each of the target devices; calculating an individual acceleration amount of each of the target devices according to the operation information and the maximum load of each of the target devices; obtaining tags of the data; dividing the data into the data blocks according to the individual acceleration amount and the tags, wherein contents with same tag in the data are divided into one data block;
    comparing a size of each data block against the maximum load; and
    sending the data block to each target device for processing in response that the size of each data block is less than the maximum load.

2. The data processing method according to claim 1, wherein determining target devices from the plurality of second electronic devices according to the data and the operation information comprises:
    calculating a load of each of the plurality of second electronic devices according to the operation information;
    determining a plurality of candidate devices from the plurality of second electronic devices according to the load; and
    determining the target devices from the plurality of candidate devices according to the data.

3. The data processing method according to claim 2, wherein determining the target devices from the plurality of candidate devices according to the data comprises:
    calculating a total acceleration amount required in respect of the data; and
    determining the target devices from the plurality of candidate devices according to the total acceleration amount.

4. The data processing method according to claim 1, after sending the data blocks to the target devices for processing, the method further comprising:
    obtaining processing results of the target devices on the data blocks; and
    generating a report showing the processing results.

5. An electronic device comprising:
    at least one processor; and
    a storage device storing computer-readable instructions, which when executed by the at least one processor, cause the at least one processor to:
    obtain data to be processed;
    receive, from a plurality of second electronic devices, operation information of the plurality of second electronic devices;
    determine target devices from the plurality of second electronic devices according to the data and the operation information;
    divide the data into data blocks according to the operation information, comprises: obtain a maximum load of each of the target devices; calculate an individual acceleration amount of each of the target devices according to the operation information and the maximum load of each of the target devices; obtain tags of the data; divide the data into the data blocks according to the individual acceleration amount and the tags, and contents with same tag in the data are divided into one data block;
    compare a size of each data block against the maximum load; and
    send the data block to each target device for processing in response that the size of each data block is less than the maximum load.

6. The electronic device according to claim 5, wherein the at least one processor is further caused to:
    calculate a load of each of the plurality of second electronic devices according to the operation information;
    determine a plurality of candidate devices from the plurality of second electronic devices according to the load; and
    determine the target devices from the plurality of candidate devices according to the data.

7. The electronic device according to claim 6, wherein the at least one processor is further caused to:
    calculate a total acceleration amount required in respect of the data; and
    determine the target devices from the plurality of candidate devices according to the total acceleration amount.

8. The electronic device according to claim 5, wherein the at least one processor is further caused to:
    obtain processing results of the target devices on the data blocks; and
    generate a report showing the processing results.

9. A non-transitory storage medium having instructions stored thereon, when the instructions are executed by a processor of an electronic device, the processor is configured to perform a data processing method, the method comprising:
    obtaining data to be processed;
    receiving, from a plurality of second electronic devices, operation information of the plurality of second electronic devices;
    determining target devices from the plurality of second electronic devices according to the data and the operation information;
    dividing the data into data blocks according to the operation information, comprises:
    obtaining a maximum load of each of the target devices; calculating an individual acceleration amount of each of the target devices according to the operation information and the maximum load of each of the target devices; obtaining tags of the data; dividing the data into the data blocks according to the individual acceleration amount and the tags, and contents with same tag in the data are divided into one data block;

comparing a size of each data block against the maximum load; and sending the data block to each target device for processing in response that the size of each data block is less than the maximum load.

10. The non-transitory storage medium according to claim 9, wherein determining target devices from the plurality of second electronic devices according to the data and the operation information comprises:

calculating a load of each of the plurality of second electronic devices according to the operation information;

determining a plurality of candidate devices from the plurality of second electronic devices according to the load; and determining the target devices from the plurality of candidate devices according to the data.

11. The non-transitory storage medium according to claim 10, wherein determining the target devices from the plurality of candidate devices according to the data comprises:

calculating a total acceleration amount required in respect of the data; and determining the target devices from the plurality of candidate devices according to the total acceleration amount.

12. The non-transitory storage medium according to claim 9, after sending the data blocks to the target devices for processing, the method further comprising:

obtaining processing results of the target devices on the data blocks; and generating a report showing the processing results.

* * * * *